No. 684,324. Patented Oct. 8, 1901.
T. J. THORP.
BALING PRESS.
(Application filed Aug. 13, 1897.)
(No Model.) 4 Sheets—Sheet 1.
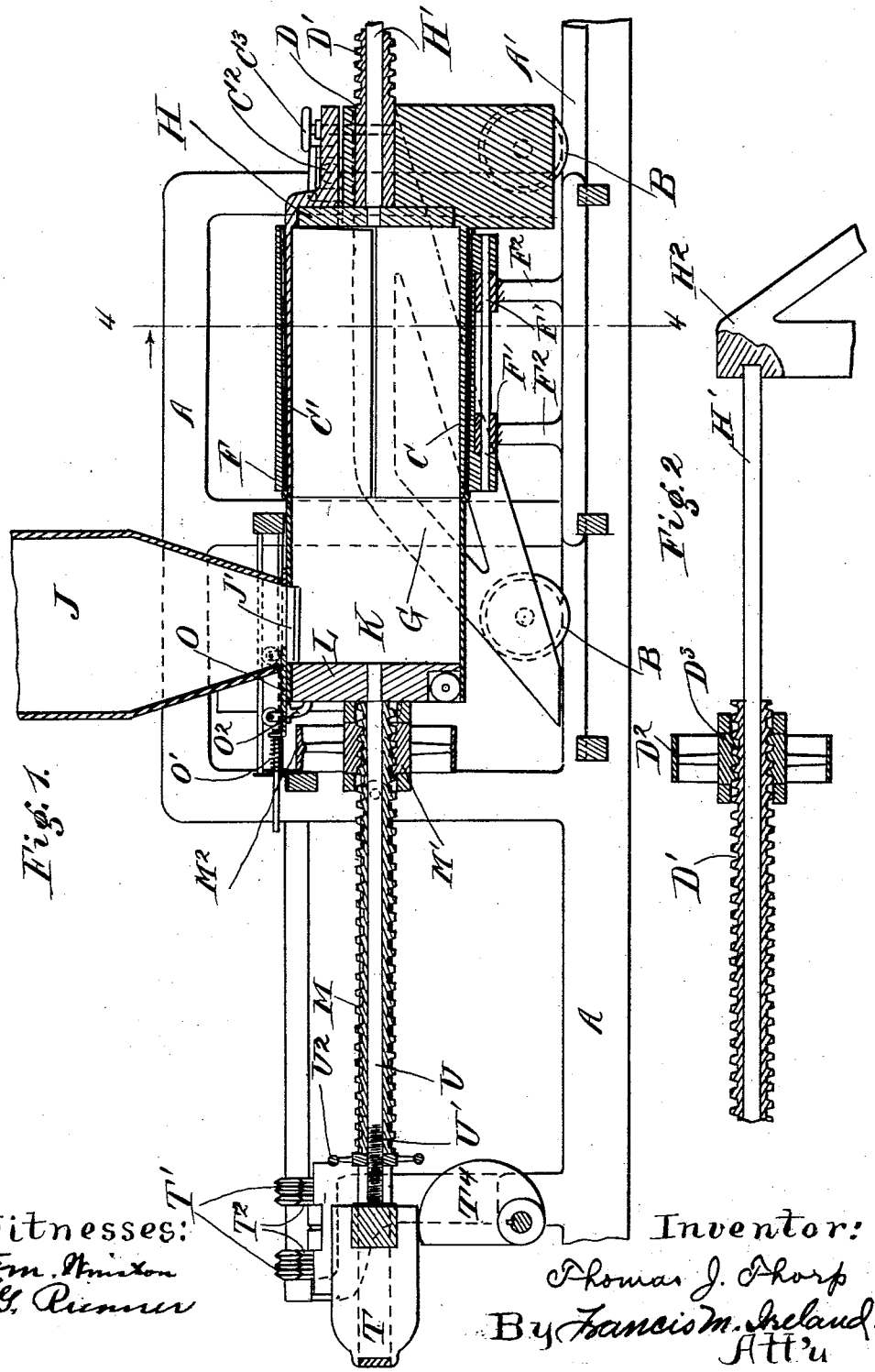
Witnesses:
Inventor:
Thomas J. Thorp
By Francis M. Ireland.
Att'y

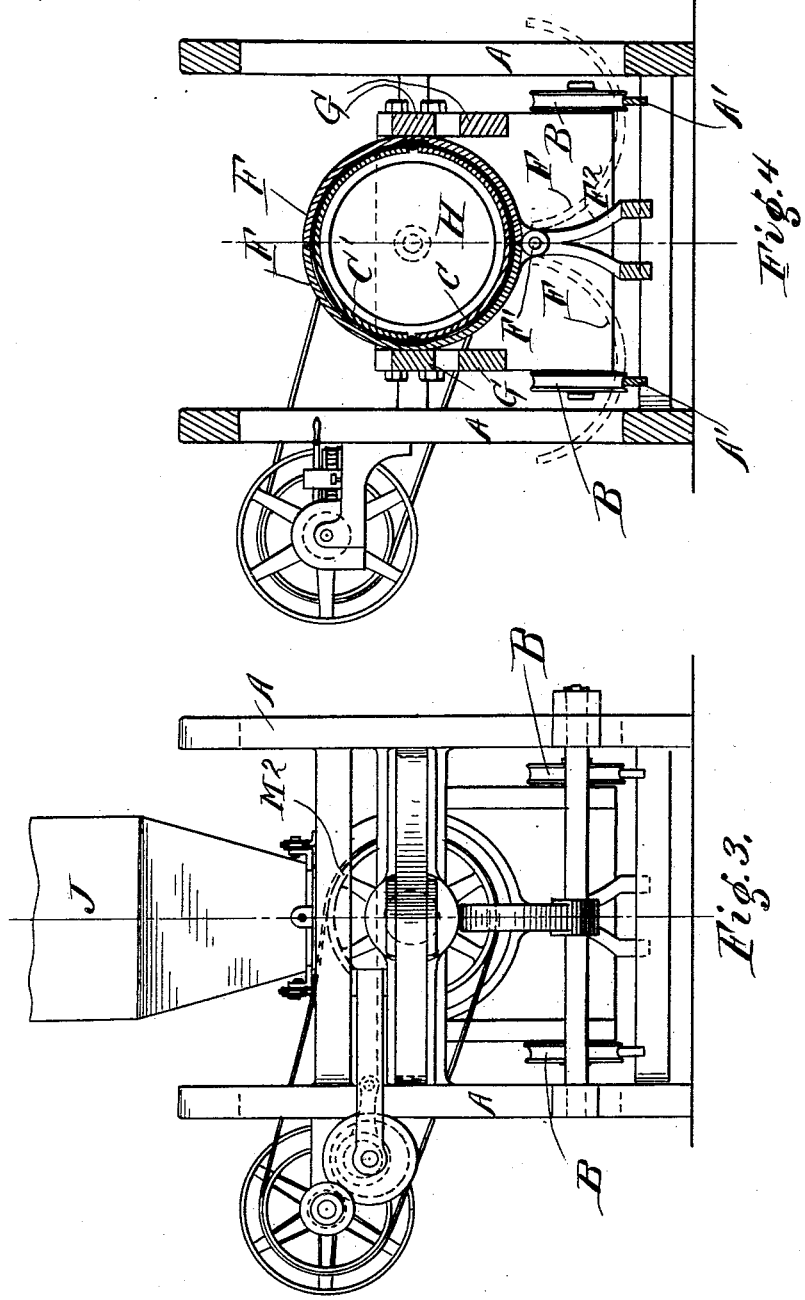

No. 684,324. Patented Oct. 8, 1901.
T. J. THORP.
BALING PRESS.
(Application filed Aug. 13, 1897.)
(No Model.) 4 Sheets—Sheet 3.
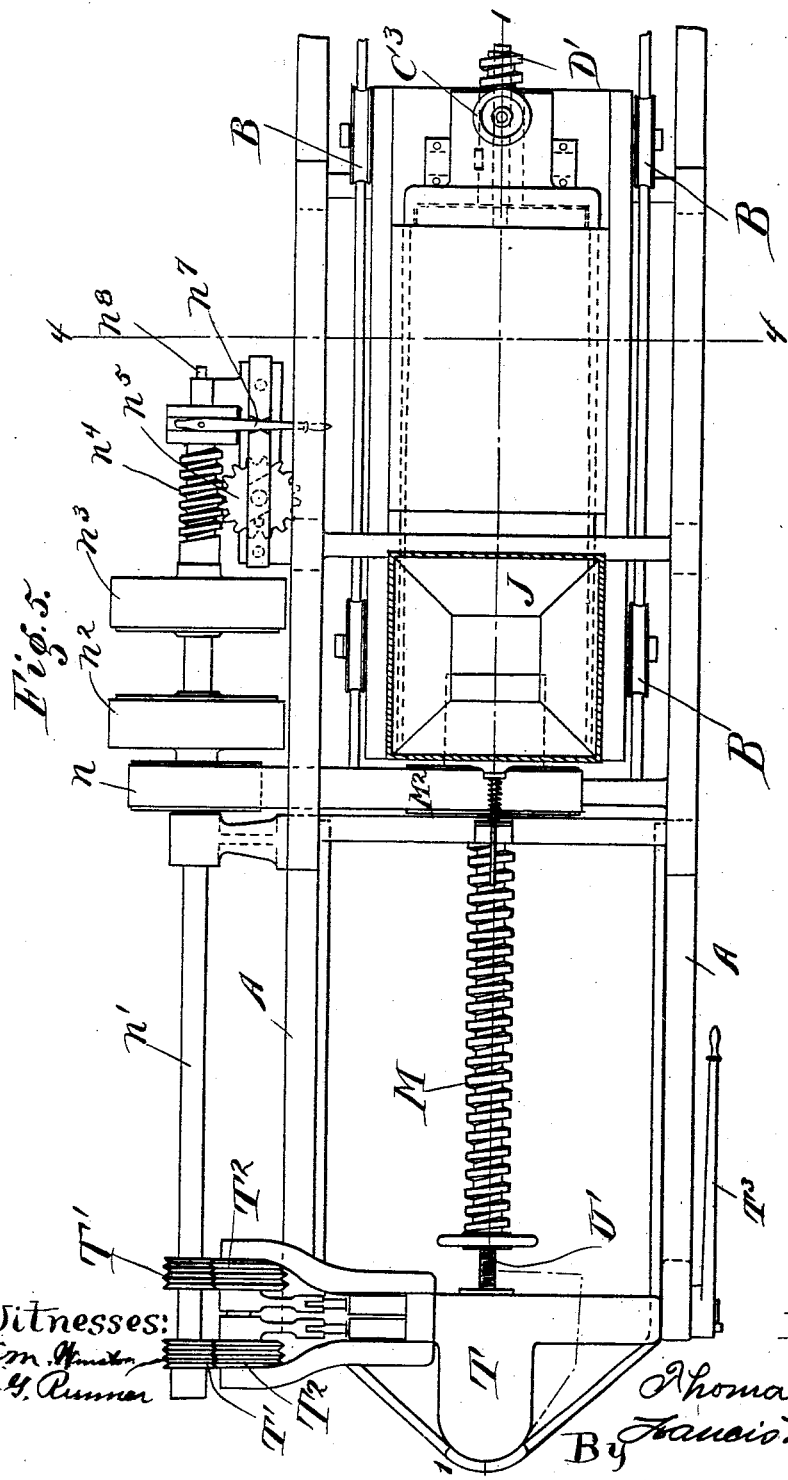
Witnesses:
Inventor:
Thomas J. Thorp
By Francis M. Ireland
Atty No. 684,324. Patented Oct. 8, 1901.
T. J. THORP.
BALING PRESS.
(Application filed Aug. 13, 1897.)
(No Model.) 4 Sheets—Sheet 4.
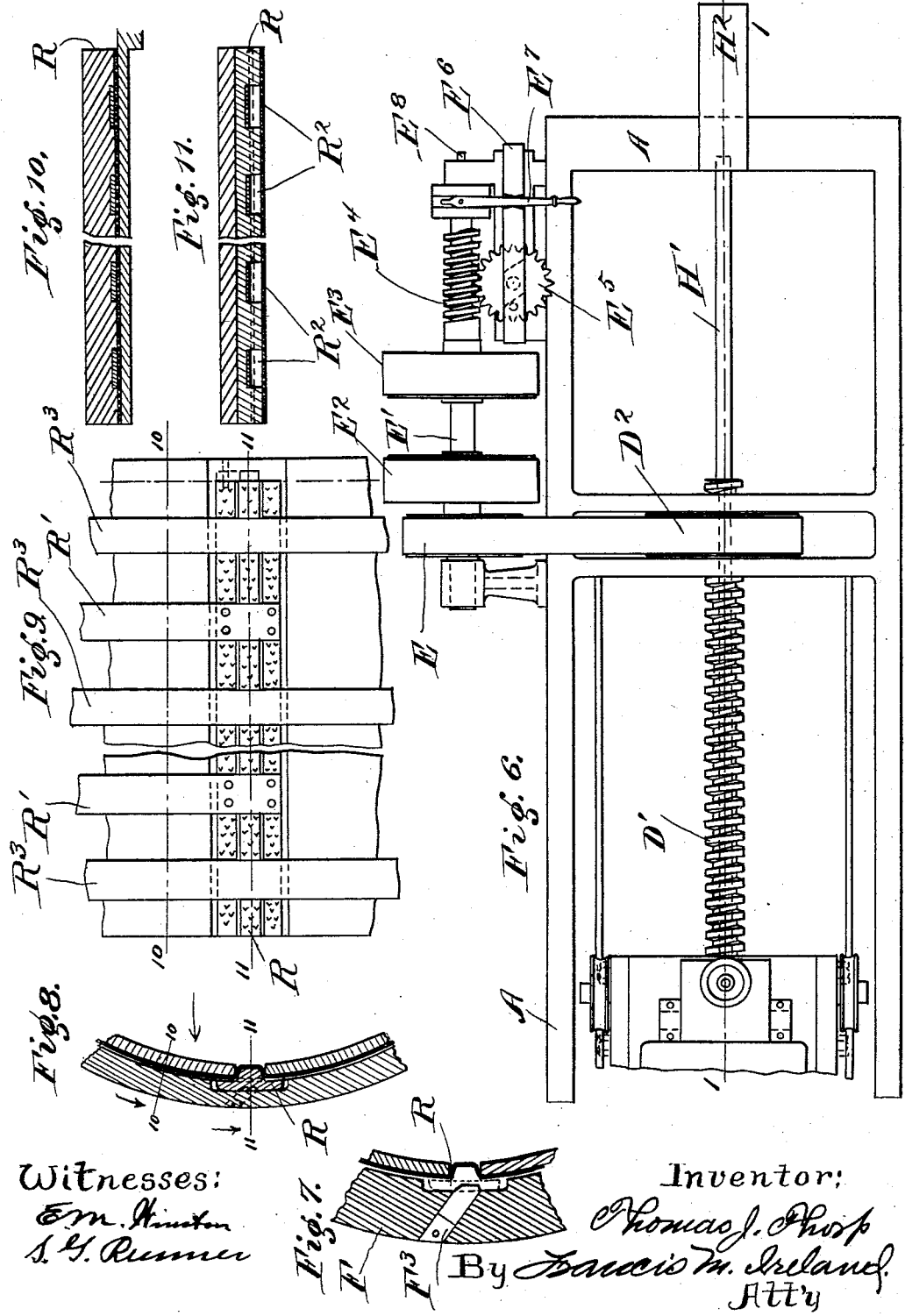
Witnesses:
Inventor:
Thomas J. Thorp
By Francis M. Ireland
Att'y

UNITED STATES PATENT OFFICE.

THOMAS J. THORP, OF FORESTGROVE, OREGON, ASSIGNOR OF ONE-FOURTH TO GEORGE E. DAWSON AND JAMES C. THOMAS, OF CHICAGO, ILLINOIS.

BALING-PRESS.

SPECIFICATION forming part of Letters Patent No. 684,324, dated October 8, 1901.

Application filed August 13, 1897. Serial No. 648,185. (No model.)

*To all whom it may concern:*

Be it known that I, THOMAS J. THORP, a citizen of the United States, residing at Forestgrove, in the county of Washington and State of Oregon, have invented certain new and useful Improvements in Baling-Presses, of which the following is a full and clear description, which will enable others skilled in the art to which it appertains to make and use the same.

My invention relates to presses for baling cotton, wool, hemp, hay, and any and all vegetable and animal fibers which it is usual or desirable to bale.

The object of my invention is to produce a press which will receive the loose fiber and turn it out a compact and finished bale, ready for shipment or storage. The ordinary process heretofore employed has been to form the fiber into a bale, generally rectangular in cross-section, and then sew a sack upon it; but I propose to form such bale, in the first place, within a cylindrical sack, so that when the bale comes from the machine nothing further is necessary to complete it unless it be desired to have ends to the sack, in which case these may be sewed on by hand.

Briefly described, my invention consists of a cylindrical sack-holder upon which the endless sack to be filled is stretched, mechanism for advancing this sack-holder up to the feeding-chamber, a hopper in which the material to be baled is placed, communicating with a feeding chamber or cylinder, and a piston within such feeding chamber or cylinder to force such material from the feeding-chamber into the extended sack until the sack is full of the compressed material. A hydraulic jack may also be employed for the purpose of still further compressing the bale.

I will now describe my device more in detail, reference being had to the accompanying drawings, wherein—

Figures 1 and 2 show a longitudinal vertical section through a press embodying my invention on line 1 1 of Figs. 5 and 6. Fig. 3 is an end elevation. Fig. 4 is a cross-section on line 4 4 of Fig. 1. Figs. 5 and 6 show a plan view of the machine. Figs. 7, 8, 9, 10, and 11 are details showing the method of securing the bands in proper place upon the bale and will be more particularly described hereinafter.

Like parts are indicated by the same letter in all the figures.

A is a frame in which the various parts forming the press are mounted.

Running upon rails A' A' are the wheels B B, supporting the sack-holder. The sack-holder proper is a cylindrical shell over which the sack is slipped, and it is preferably formed of the two half-shells C C', one of which is movable. As shown in the drawings, the lower half-shell C is formed integral with the frame of the sack-holder supported by the wheels B, and the upper half-shell C' is journaled at $C^2$ in a portion of such frame, and the rear portion thereof is provided with the hand-wheel $C^3$, by which it may be moved to slightly dip the forward portion, so that the sack may be more easily slipped into position upon the holder—that is, the two half-shells are slightly separated. The upper one is pivotally mounted at $C^2$ and has a screw connection at its rear portion with the rear portion of the lower half-shell, so that by operating the hand-wheel and screw the forward portion of the upper pivotally-mounted half-shell may be moved toward and away from the forward portion of the lower half-shell.

The frame carrying the sack-holder is adapted to travel to and fro over the rails A', so that it may be withdrawn and a sack placed in position and may then be moved forward again into the position shown in Figs. 1 and 5. Mechanism by which this sack-holder and frame may be moved forward and withdrawn is shown in Figs. 1 and 2 and 5 and 6.

D is a hollow shaft having the worm D' formed thereon and secured at its forward end to the frame of the sack-holder.

$D^2$ is a pulley which may be driven by a belt from the pulley E on the shaft E', journaled in brackets extending from the frame A. This shaft E' is adapted to be driven in either direction by the friction-clutches and belt-wheels $E^2 E^3$, carrying one a straight belt and the other a cross-belt if driven from the same power-shaft.

$E^4$ is a wormed shaft continuously rotating with the belt-wheel $E^3$ and turning the gear $E^5$, which reciprocates the sliding bar $E^6$, which shifts the lever E⁷. The lever E⁷ in turn reciprocates the shifting-rod E⁸, which alternately throws the clutches E² E³ into operation and causes the shaft E' to alternately rotate in opposite directions. The object of this device is to cause the automatic reversal of the direction of rotation of the shaft E' after it shall have turned through a prescribed number of revolutions in one direction. I have not described the construction of parts more in detail for the reason that I do not claim them herein, any device which will accomplish this result being sufficient for the purposes of the present application. Within the hub of the belt-wheel D² is a nut D³, which works on the screw D', thereby reciprocating the shaft D and withdrawing the sack-holder when the shaft E' is rotating in one direction and advancing it when it is rotating in the opposite direction.

F F are two half-shells which lie in the position shown in the dotted lines in Fig. 4 when the sack-holder and frame are withdrawn and which are pivoted at F' F' to the standards F², secured to the main frame A. As the sack-holder frame is advanced the cam-bars G G, one upon each side of said frame and formed, as shown, so as to present their cam-faces to the half-shells, will lift these half-shells gradually upward until the sack-holder reaches its farthest forward position, when the two half-shells F F will be firmly pressed upon the sack, forming a strong shell about it to strengthen it during the operation of baling.

H is a plate secured to the end of the rod H', the other end of which is supported by the abutment H². When the sack-holder is moved forward, this disk H passes through the extended sack and forms a back plate to close the end of such sack during the operation of baling.

J is the hopper into which the fiber to be baled is thrown. J' is an opening in said hopper communicating with the feed chamber or cylinder K.

L is a piston adapted to be reciprocated in the feed-chamber by the hollow sleeve M. This sleeve upon its outer surface has a screw which is operated by the nut M' in the hub of the belt-wheel M², which is driven from the shaft N'. This shaft N' is provided with a device similar to that hereinbefore referred to in connection with shaft E', whereby its direction of rotation may be automatically and periodically reversed. The nut M' when in operation will therefore be turned alternately in opposite directions and the sleeve M will be reciprocated. This sleeve M surrounds the piston-rod U between the piston L and hand-wheel U² and by its reciprocations reciprocates the piston-rod and piston.

O is a sliding door adapted to close the opening J' in the hopper when the piston L moves forward into the feeding-chamber. O' is a spring which forces said door O forward into the closed position.

O² is an arm projecting from the door O in the path of the piston L and adapted to be caught by said piston as it is withdrawn from its forward stroke to open the door.

It may be desirable to strengthen the bale by bands of hoop-iron or other material. In this event the bands already formed may be slipped over the sack after it has been placed upon the sack-holder and before it has been tightened. In order to have these bands properly spaced and to still further strengthen the sack and bale during the operation of filling and of removing the holder, use may be made of the device illustrated in Figs. 7, 8, 9, 10, and 11, which may be termed a "spacer." Figs. 7 and 8 are cross-sections through a portion of the holder, sack, spacer, and outer shell as they are during the operation of filling. Fig. 9 is a view of hoop-iron bands, spacer, and outer shell as it would appear viewed in the direction of arrow in Fig. 8, with sack and holder removed. Figs. 10 and 11 are longitudinal sections through the parts as they would appear along line 10 10 and 11 11 of Fig. 9. The spacer consists of two straps or bars of metal R, one of which is seen in Fig. 9, to which are attached the ends of the half-hoops R'. This device consists of a cylindrical half-shell to conform to the shape of the bale and is formed of two bars placed longitudinally one upon each side of the half-shell and a number of half-hoops, each of which is attached at each end to one of the bars. The bars R have the cross-slots R² properly placed to receive the hoops R³ upon the sack when the spacer is placed in position.

F³ is a finger or projection on the outer shell F, so positioned that when the half-shells are closed upon the sack this finger will engage the end of the bar R to brace it and hold spacer, hoops, and sack in place upon the bale while the holder is being withdrawn.

The operation of my invention will by this time be clear. The frame carrying the sack-holder being withdrawn and the sack-holder being slightly collapsed the endless sack will be slipped into position over the sack-holder. The hoops will now be slipped over the sack and placed approximately in their proper positions. The spacer will now be thrown upon the sack, and the hoops R³ will be so adjusted that they rest within the slots R². The hand-wheel C³ will now be operated to elevate the half-shell C' and stretch the sack taut. The lever E⁷ will then be thrown down into the position shown in Fig. 6, and the sack-holder and frame will be advanced up to the position shown in Fig. 1, when the lever E⁷ will be lifted again to bring such motion to a stop. As the sack-holder moves forward the cam-bars G lift the sections of the outer shell F until they firmly clasp the sack-holder and sack. The lever N⁷ will then be thrown down into the position shown in Fig. 5, whereupon the piston L will reciprocate in the feeding-chamber K. The hopper being supplied with the fiber to be baled this will pass when the parts are in the position shown in Fig. 1 into the feeding-chamber. As the piston L moves forward the material in the feeding-chamber will be forced into the sack. The action of the spring O' will close the door O of the aperture J' as the piston is advanced, and as the piston is withdrawn it will strike the arm O² and open said door, so as to permit a fresh supply of material to fall from the hopper into the feeding-chamber. This operation will continue until the sack has been rammed full of the material and the same is compressed so far as the ordinary strokes of the piston will compress it. It may be desired to apply still greater force to still further compress the bale, and this may be done by the use of the hydraulic jack. To apply this jack, the lever N⁷ will be thrown up when the piston has been thrust forward by the sleeve M and is pressing against the bale. The hand-wheel U² on the threaded portion U' of the piston-rod U will then be turned back toward the end of the piston-rod. The hydraulic jack T is mounted in a frame hinged at each side to the main frame A, and during the ordinary operation of the machine will be swung down out of the way of the reciprocating piston-rod. It will now be swung up into the position shown in the drawings by moving the lever T³, which turns the shaft-carrying cam T⁴, and immediately upon the friction-wheels T² upon the shaft which drives the pumping-pistons of the hydraulic jack coming into engagement with the friction-wheels T' upon the rotating shaft N' the jack will be thrown into operation and its presser-piston will force the piston-rod U and piston L forward, thereby compressing the bale. The plate H at the other end of the bale, which is backed by the rod H' and abutment H², will receive the strain when the hydraulic jack is applied. When the bale is sufficiently compressed, the lever E⁷ will be thrown down, and the frame carrying the sack-holder will be withdrawn. The plate H, backed by the rod H' and abutment H², will hold the bale and prevent its being withdrawn with the holder, and the lock F³, bearing against the end of the bar R, will securely hold the spacer and the bands in their proper positions. As the holder is still further withdrawn the cam-bars G will permit the half-shells F to fall back into the position shown in dotted lines in Fig. 4, and the finished bale will lie in one or the other of these half-shells.

In designing the baling-press herein shown I have had particularly in mind the equipment of a complete plant for scouring, drying, and baling wool on a large scale, of which the baling-press herein shown and the scouring-machine shown in my application pending cotemporaneously herewith are to form features; but I am well aware of the different uses to which my invention herein set forth may be put and of many variations and modifications which may be made in some of the parts thereof in order to adapt it to different uses, and I do not wish to limit myself to the precise construction of parts here shown by reason of the language I have used in describing my invention having been employed with reference to one concrete embodiment thereof which I had in mind. For example, I have referred to the cylindrical shell C C' throughout as a sack-holder; but it might be desirable in the baling of certain substances, such as hay, not to employ any sack, and it will readily be seen that such bales could be formed with a press substantially as herein shown, the hoop-iron bands being sufficient of themselves to hold the bale in shape when it is formed.

What I claim as new, and desire to secure by Letters Patent, is—

1. In a baling-press a sack-holder adapted to receive the sack in which the bale is to be formed and to hold the same while the bale is being formed therein, said sack-holder consisting of sections movable with reference to each other so that the sack-holder may be partially collapsed to facilitate placing the sack thereon.

2. In a baling-press a cylindrical sack-holder adapted to receive the sack in which the bale is to be formed and to hold the same while the bale is being formed therein, said sack-holder consisting of sections movable with reference to each other so that the sack-holder may be partially collapsed to facilitate placing the sack thereon.

3. In a baling-press, the sack-holder C C' over which the sack within which the bale is to be formed is adapted to be slipped, said sack-holder consisting of sections movable with reference to each other so that the sack-holder may be partially collapsed to facilitate placing the sack thereon, and an outer shell F F adapted to be closed upon the sack and holder during the baling operation, substantially as set forth.

4. In a baling-press a cylindrical shell consisting of sections movable with reference to each other and adapted to be contracted to permit a sack and binding-hoops to be slipped thereover and then to be expanded to stretch the same taut, a spacing device adapted to be thrown over sack and hoops to hold the latter in proper relative position upon the sack during the baling operation, and an outer strengthening-shell adapted to be closed upon the sack and spacing device during the baling operation.

5. In a baling-press a cylindrical shell consisting of sections movable with reference to each other and adapted to be contracted to permit a sack and binding-hoops to be slipped thereover and then to be expanded to stretch the same taut, a spacing device adapted to be thrown over sack and hoops to hold the latter in proper relative position upon the sack during the baling operation, an outer strengthening-shell adapted to be closed upon the sack and spacing device during the baling operation, and mechanism for withdrawing the cylindrical shell when the bale has been formed within the sack.

6. In a baling-press, a piston in combination with the piston-rod U to which it is secured, the hollow sleeve M upon said piston-rod through which the power is applied to reciprocate the piston, a device whereby said sleeve may be connected to the piston-rod to reciprocate it and may be disconnected therefrom to permit the piston-rod to slide within the sleeve, and a hydraulic jack located at the end of the piston-rod and mechanism whereby it may be applied to the piston-rod to force the piston forward under pressure.

7. In a baling-press a piston in combination with a piston-rod U to which it is secured, a hollow sleeve M upon said piston-rod provided externally with a worm, and the pulley $M^2$ and internally-threaded hub $M'$ whereby the sleeve may be reciprocated, a device whereby said sleeve may be connected to the piston-rod to reciprocate it and may be disconnected therefrom to permit the piston-rod to slide within the sleeve, and a hydraulic jack located at the end of the piston-rod and mechanism whereby it may be applied to the piston-rod to force the piston forward under pressure.

8. In a baling-press a baling-piston in combination with a piston-rod to the forward end of which it is secured, a hollow sleeve through which the power is applied to reciprocate the piston surrounding the piston-rod and its forward end bearing against the piston, a removable stop upon the piston-rod at the other end of such sleeve, and a hydraulic jack adapted to be applied to the rear end of the piston-rod and to force it forward, when the stop has been removed.

9. In a baling-press a baling-piston in combination with a piston-rod to the forward end of which it is secured, a hollow sleeve through which the power is applied to reciprocate the piston surrounding the piston-rod and its forward end bearing against the piston, a hand-wheel threaded upon the piston-rod to serve as a stop for the rear end of the sleeve, and a hydraulic jack adapted to be applied to the rear end of the piston-rod and to force it forward when the hand-wheel has been turned back out of engagement with the sleeve.

10. In a baling-press the combination of a main frame in which is mounted a feed-chamber and a piston for forcing the material to be baled from the feed-chamber into the sack-holder, an auxiliary or sack-holding frame movable with reference to the main frame, a cylindrical shell forming the sack-holder upon which the sack in which the bale is to be formed is placed and held in open position mounted upon the auxiliary frame and adapted to be advanced by said auxiliary frame into feeding connection with the feed-chamber, two half-shells pivoted to a portion of the main frame, and cam-bars upon the auxiliary frame adapted as the auxiliary frame is advanced to force said half-shells together about the sack-holder so that they will form a cylindrical shell inclosing the same.

11. In a baling-press the combination of a main frame in which is mounted a feed-chamber and a piston for forcing the material to be baled from the feed-chamber into the sack-holder, an auxiliary or sack-holding frame movable with reference to the main frame, a cylindrical shell forming the sack-holder upon which the sack in which the bale is to be formed is placed and held in open position mounted upon the auxiliary frame and adapted to be advanced by said auxiliary frame into feeding connection with the feed-chamber, two half-shells pivoted to a portion of the main frame, cam-bars upon the auxiliary frame adapted as the auxiliary frame is advanced to force said half-shells together about the sack-holder so that they will form a cylindrical shell inclosing the same, a hollow shaft secured to the rear of the sack-holder and adapted to be reciprocated to advance and withdraw the sack-holder, and a rod or bar passing through such hollow shaft and embedded in an abutment at its rear end and at its forward end supporting a disk or plate smaller in diameter than the cylindrical sack-holding shell and adapted to close the end of said sack-holder and receive the strain of the strokes of the piston during the forming of the bale and to hold the bale while the sack-holder is being withdrawn after the bale has been formed.

12. In a baling-press the combination of a main frame in which is mounted a feed-chamber and a piston for forcing the material to be baled from the feed-chamber into the sack-holder, an auxiliary or sack-holding frame movable with reference to the main frame, a cylindrical shell forming the sack-holder upon which the sack in which the bale is to be formed is placed and held in open position mounted upon the auxiliary frame and adapted to be advanced by said auxiliary frame into feeding connection with the feed-chamber, two half-shells pivoted to a portion of the main frame, cam-bars upon the auxiliary frame adapted as the auxiliary frame is advanced to force said half-shells together about the sack-holder so that they will form a cylindrical shell inclosing the same, and a firmly-seated plate or disk adapted when the baling operation is going on to close the end of the sack-holder and receive the strain of the impact of the piston.

THOMAS J. THORP.

Witnesses:
C. W. MILLER,
E. E. MILLER.